United States Patent
Spjuth et al.

(10) Patent No.: US 12,201,910 B2
(45) Date of Patent: Jan. 21, 2025

(54) METHOD FOR A GAMING SYSTEM

(71) Applicant: Play'n Go Marks Ltd., Sliema (MT)

(72) Inventors: Johan Spjuth, Sliema (MT); Richard Bexborn, Sliema (MT)

(73) Assignee: Play'n Go Marks Ltd., Sliema (MT)

( * ) Notice: Subject to any disclaimer, the term of this patent is extended or adjusted under 35 U.S.C. 154(b) by 0 days.

(21) Appl. No.: 17/766,238

(22) PCT Filed: Oct. 8, 2020

(86) PCT No.: PCT/SE2020/050963
§ 371 (c)(1),
(2) Date: Apr. 2, 2022

(87) PCT Pub. No.: WO2021/071417
PCT Pub. Date: Apr. 15, 2021

(65) Prior Publication Data
US 2024/0050862 A1     Feb. 15, 2024

(30) Foreign Application Priority Data
Oct. 9, 2019    (SE) ..................... 1951150-0

(51) Int. Cl.
G07F 17/32     (2006.01)
A63F 13/30     (2014.01)
A63F 13/798    (2014.01)
G06Q 50/34     (2012.01)

(52) U.S. Cl.
CPC ............ *A63F 13/798* (2014.09); *A63F 13/30* (2014.09)

(58) Field of Classification Search
CPC ............... G07F 17/323; G07F 17/3239; G07F 17/3244; G07F 17/326; G07F 17/3267; G07F 17/3272; G07F 17/3276; G07F 17/3288; A63F 13/798; G06Q 50/34
See application file for complete search history.

(56) References Cited

U.S. PATENT DOCUMENTS

| | | | |
|---|---|---|---|
| 11,138,835 B1* | 10/2021 | Friedman | ............ G07F 17/3244 |
| 2013/0331967 A1 | 12/2013 | Amaitis et al. | |
| 2014/0135094 A1 | 5/2014 | Dewaal | |
| 2017/0103615 A1 | 4/2017 | Theodosopoulos | |

(Continued)

FOREIGN PATENT DOCUMENTS

| | | |
|---|---|---|
| WO | 2011011466 A1 | 1/2011 |
| WO | 2011053639 A1 | 5/2011 |

(Continued)

OTHER PUBLICATIONS

PCT International Search Report and Written Opinion mailed Jan. 18, 2021 for International Application No. PCT/SE2020/050963, 12 pages.

(Continued)

*Primary Examiner* — Lawrence S Galka
(74) *Attorney, Agent, or Firm* — RMCK Law Group, PLC

(57) ABSTRACT

The present disclosure relates to a computer implemented method performed by a gaming system. In particular, the present disclosure relates to a method specifically handling a process for ranking a plurality of electronic user devices each involved in a game, possibly being different games. The present disclosure also relates to a corresponding electronic gaming system and a computer program product.

19 Claims, 4 Drawing Sheets

| Name | ⊙ Total score | ★ Rank |
|---|---|---|
| User X | 5210 | 1 |
| User Y | 2290 | 2 |
| User Z | 1980 | 3 |
| User D | 1899 | 4 |
| User P | 1530 | 5 |
| ⋮ | ⋮ | ⋮ |

(56) References Cited

U.S. PATENT DOCUMENTS

| | | |
|---|---|---|
| 2017/0132869 A1 | 5/2017 | Surmacz et al. |
| 2018/0018855 A1 | 1/2018 | Riggs |
| 2019/0035220 A1 | 1/2019 | deWaal |
| 2020/0043293 A1* | 2/2020 | Nelson ................. G07F 17/323 |
| 2020/0302736 A1* | 9/2020 | Rizos ................. G07F 17/3267 |

FOREIGN PATENT DOCUMENTS

| | | |
|---|---|---|
| WO | 2013184258 A1 | 12/2013 |
| WO | 2014083533 A1 | 6/2014 |

OTHER PUBLICATIONS

Extended European Search Report dated Oct. 18, 2023 for EP Application No. 20873468.1, 10 pages.

* cited by examiner

| Name | ⊙ Total score | ★ Rank |
|---|---|---|
| User X | 5210 | 1 |
| User Y | 2290 | 2 |
| User Z | 1980 | 3 |
| User D | 1899 | 4 |
| User P | 1530 | 5 |
| ⋮ | ⋮ | ⋮ |

*Fig. 3A*

| Name | ⊙ Total score | ★ Rank |
|---|---|---|
| Sweden | 28115 | 1 |
| Malta | 24232 | 2 |
| UK | 15241 | 3 |
| US | 12142 | 4 |
| Norway | 9820 | 5 |
| ⋮ | ⋮ | ⋮ |

*Fig. 3B*

METHOD FOR A GAMING SYSTEM

CROSS-REFERENCE TO RELATED APPLICATIONS

This application is a 371 U.S. National Stage of International Application No. PCT/SE2020/050963, filed Oct. 8, 2020, which claims priority to Swedish Patent Application No. 1951150-0, filed Oct. 9, 2019. The disclosures of each of the above applications are incorporated herein by reference in their entirety.

TECHNICAL FIELD

The present disclosure relates to a computer implemented method performed by a gaming system. In particular, the present disclosure relates to a method specifically handling a process for ranking a plurality of electronic user devices each involved in a game, possibly being different games. The present disclosure also relates to a corresponding electronic gaming system and a computer program product.

BACKGROUND

Games of chance are known and widely played for recreational purposes. The gaming industry has come to recognize that to sustain long term success it must be constantly innovative in introducing new games and new gambling concepts to the gaming public. One example of this innovating drive can be appreciated in the embrace of the Internet and online gaming by the gaming industry.

A common trend within the online gaming industry is to provide potentially new and current players with new means for attracting and ensuring that players remain at the online site providing the games. An example of such a means is the use of leaderboards. Leaderboards are used as scoreboards for players to keep track of their scores or winnings in a wagering game. A leaderboard can encourage a spirit of competition among players by comparing and ranking a top set of players based on scores, starting with a highest scoring player to a lowest scoring player. Additionally, the leaderboard is updated at regular intervals to reflect a latest top set of players and player scores.

Even though the presently available leaderboard scheme may give the player some enhanced experience, they are generally limited in how different players with different behavior may be equally ranked. Accordingly, there is a need for a more comprehensive method for allowing a vast plurality of players to possibly join in a common leaderboard.

SUMMARY

According to an aspect of the present disclosure, the above is at least partly met by a computer implemented method performed by a gaming system, the gaming system comprising a server arranged in communication with a plurality of electronic user devices using a network connection, the plurality of electronic user devices each provided with a display unit adapted to present a graphical user interface (GUI), wherein the method comprises the steps of receiving, at the server, a request from a first electronic user device of the plurality of electronic user devices to enter into one of a plurality of games provided by the server, the request comprising a selection of a first one of the plurality of games and a bet for the selected first game, executing, at the server, the first selected game with the bet, determining, at the server, an outcome of the executed first selected game, determining, at the server, a first score for the first electronic user device based on a comparison of the bet and the outcome, ranking, at the server, the plurality of electronic user devices in a leaderboard based on a comparison of the first score with a plurality of corresponding scores for the remaining plurality of electronic user devices, including providing each of the plurality of electronic user devices with a ranking level within the leaderboard, removing, at the server, the first electronic user device from the leaderboard if the level of ranking for the first electronic user device is below a predetermined threshold, wherein the predetermined threshold is increased over time, forming, at the server, a graphical representation of the leaderboard, distributing, from the server to the plurality of electronic user devices, the graphical representation of the leaderboard, and controlling, using the server, the plurality of electronic user devices to display the graphical representation of the leaderboard within the GUI of each of the plurality of electronic user devices.

The general concept of the present disclosure is based on the fact that it may be possible to improve the attraction to a gaming concept by allowing for players operating individual electronic user devices and possibly playing different games to share a common leaderboard, where the individual players may be ranked and compared to each other based on a threshold which threshold increases over time. In line with the present disclosure, a bet placed by an individual player (operating his electronic specific user device) and the outcome of the bet will be used to form a specific score for that player playing a specific game.

An advantage following the present concept is that the score for the player may then be compared to scores from other players playing the same game (with individual bets and outcomes) as well as with players playing different games. Furthermore, as the threshold changes players will be drawn to playing the game in order to avoid being removed from the leaderboard.

As is well known, different games may have different ratios in regards to an outcome of the game in response to a bet "of the same level". That is, some games pay in comparison better, but will then give less payouts as compared to a game paying less. This may however be handled using the concept of the present disclosure, possibly allowing a complete online site providing a plurality of games to share a single and common leaderboard. Such a common leaderboard may, as will be elaborated below, be used for e.g. rewarding successful players.

Within the context of the present disclosure the expression "forming a graphical representation of the leaderboard" should be interpreted broadly. Specifically, it should be understood that the server in some embodiments may be configured to only form a collection of data (here corresponding to the graphical representation) that will be rendered at the frontend, such as within the GUI of the electronic user device.

However, in another embodiment it may be the other way around, meaning that the server will essentially form an image (here corresponding to the graphical representation) that then will be displayed within the GUI of the electronic user device. Further alternative implementations along the same mutations are possible and within the scope of the present disclosure. Additionally, it should be understood that displaying of the graphical representation of the leaderboard must not necessary include displaying all information, but rather in some embodiment only a (e.g. relevant) portion of the total leaderboard is displayed. It may for example, be possible to select only a portion of the leaderboard where the specific user is present and display this portion to the user.

Furthermore, and in accordance to the present disclosure, the "removal" of the first electronic user device from the leaderboard could in some embodiments relate to just deleting the first electronic user device from the list defining the leaderboard. However, in some other embodiments it may be possible to ensure that the first electronic user device is disconnected from the server in such a sense that the first electronic user device is no longer connected to the function of the server providing the leaderboard scheme according to the present disclosure. For example, removing the first electronic user device could include disconnecting the first electronic user device from the server. Removing the first electronic user device from the server could also alternatively or in addition include removing any data relating to the first electronic user device from the server.

In an embodiment of the present disclosure, the first score for the first electronic user device is formed by accumulating scores from a plurality of subsequently executed games requested by the first electronic user device.

That is, the comparison and ranking between the different players may typically involve a plurality of games played in parallel or subsequently by the different players. The ranking will as such progress over time.

Possibly, only scores larger than zero are included when accumulating the scores. That is, in case the game is unsuccessful, and the player loses his bet, then that score is not included in the ranking procedure. It should however be understood that this is only an optional embodiment of the present disclosure. Specifically, in regards to games that are based on skill rather than luck it may be possible to allow all scores to be included when performing the accumulation as mentioned above.

In a possible embodiment of the present disclosure, the operation of ranking the plurality of electronic user devices is further based on the game selected by each of the plurality of electronic user devices. For example, different games may be separated into different leaderboards, or different games may be giving different weights in the ranking procedure.

As an example, in one embodiment the determination of the first score for the first electronic user device may be further based on a multiplication factor, where the multiplication factor may be based on a parameter of game selected by the first electronic user device.

The multiplication factor may be time based, meaning that e.g. the time spend on a specific game may be used as a driver for increasing the weight for a specific player, for example the game can provide for giving a player double or triple points if the game is played within a particular time frame. Within the scope of the present disclosure it could also be possible to allow the weight or any other similar parameter to be decided by the provider of the game.

Accordingly, in some embodiment the player may be rewarded for spending an in comparison long time playing a specific game. The multiplication factor may also be dependent on a e.g. time of the day. Accordingly, using such a functionality it could be possible to steer when players are to play the games, possibly providing such that servers are offloaded as compared to other time periods.

For example, it may be possible to allow such time periods of an increased multiplication factors to times of the day where normally the server load is in comparison low (i.e. steer from times when the load is in comparison high). The time periods with an increase multiplication factor may possibly be dependent on a historical server load.

The present disclosure comprises the steps of comparing, at the server, the level of ranking for the first electronic user device with a threshold which threshold dynamically increases over time. In this regard the invention provides for removing, at the server, an electronic user device from the leaderboard by virtue of its level of ranking i.e. the least successful player or player(s) of the leaderboard. This removal of a least successful player from the leaderboard in turn increases the threshold to enter the leaderboard. This is because for a player to join the leaderboard a score above the score of the second least successful player as opposed to the least successful player will need to be matched or beaten once the least successful player is removed from the leaderboard.

The threshold will increase as more and more least successful players are removed from the leaderboard and is therefore dynamically increased over time. This embodiment of the invention comprises dividing a specified time frame that a leaderboard is to run for into intervals and then removing a least successful player or players from the leaderboard at an end of each interval. The intervals may be equal in length or vary in length.

The interval may be determined by dividing the specified time frame of the leaderboard by a number of players that originally join the leaderboard. Further, the intervals may be determined by use of a pseudo algorithm. The time intervals may be determined by both dividing the specified time frame by the number of players that originally join the leaderboard and use of the algorithm.

The algorithm may provide for varying intervals. The intervals may vary in length as the leaderboard begins or approaches its end time phase, for example, the intervals may be shorter or longer at a beginning or end phase of the specified time frame. If such an embodiment is employed, then least successful players will be removed from the leaderboard at a quicker pace as the end phases of the leaderboard or at the beginning phases of the leaderboard. Alternatively, the intervals may vary in length over the entire time frame that the leaderboard is played.

In this embodiment it may also be provided to only show the updated leaderboard to the players that still form part of the leaderboard at the specific date and time. Players are therefore encouraged to revisit the leaderboard to improve their scores and ensure that they are not excluded from the leaderboard. The remaining player(s) may then for example be provided with a reward. A reward may as an alternative also be provided at predetermined or random time intervals to the players being part of the leaderboard.

In one embodiment of the present disclosure the request further comprises a geographical location of the first electronic user device and only electronic user devices located within the same geographical location is arranged in the same leaderboard. The geographical location may then be used for forming, at the server, a plurality of groups of electronic user devices from the plurality of electronic user devices based on the geographical location for each of the plurality of electronic user device, wherein each of the plurality of groups of electronic user devices only comprises electronic user devices from the same geographical area. Accordingly, it may be possible to allow different groups to compete against each other. For example, this may allow groups to be formed based on city, country or continent. It should however be understood that it could be possible to allow other types of groups to be formed, such as relating to different gaming behaviors, gaming patterns, betting levels, age, sex, etc. It may also be possible to form fully or partly random groups. Still further, the online site or the operator may manually, semi-automatically or fully automatically form suitable groups.

According to another aspect of the present disclosure there is provided a gaming system comprising a server arranged in communication with a plurality of electronic user devices using a network connection, the plurality of electronic user devices each provided with a display unit adapted to present a graphical user interface (GUI), wherein the server is adapted to receive a request from a first electronic user device of the plurality of electronic user devices to enter into one of a plurality of games provided by the server, the request comprising a selection of a first one of the plurality of games and a bet for the selected first game, execute the first selected game with the bet, determine an outcome of the executed first selected game, determine a first score for the first electronic user device based on a comparison of the bet and the outcome, rank the plurality of electronic user devices in a leaderboard based on a comparison of the first score with a plurality of corresponding scores for the remaining plurality of electronic user devices, including providing each of the plurality of electronic user devices with a ranking level within the leaderboard, remove the first electronic user device from the leaderboard if the level of ranking for the first electronic user device is below a predetermined threshold, wherein the predetermined threshold is increased over time, form a graphical representation of the leaderboard, distribute, to the plurality of electronic user devices, the graphical representation of the leaderboard, and control the plurality of electronic user devices to display the graphical representation of the leaderboard within the GUI of each of the plurality of electronic user devices. This aspect of the present disclosure provides similar advantages and includes similar embodiments as discussed above in relation to the previous aspects of the present disclosure.

Preferably, the gaming system is a cloud-based computing system and the server is a cloud server. Thus, the computing power provided by means of the invention may be distributed between a plurality of servers, and the location of the servers must not be explicitly defined. Advantageous following the use of a cloud-based solution is also the inherent redundancy achieved.

In some embodiments the electronic user devices may be selected to include e.g. a computer (laptop/stationary), a mobile phone, a tablet, a (gaming) consoles or any other gaming device and gambling terminals. The GUI may in some embodiments be allowed to depend on the type of electronic user device.

According to a still further aspect of the present disclosure there is provided a computer program product comprising a computer readable medium having stored thereon computer program means for operating a gaming system, the gaming system comprising a server arranged in communication with a plurality of electronic user devices using a network connection, the plurality of electronic user devices each provided with a display unit adapted to present a graphical user interface (GUI), wherein the computer program product comprises code for receiving, at the server, a request from a first electronic user device of the plurality of electronic user devices to enter into one of a plurality of games provided by the server, the request comprising a selection of a first one of the plurality of games and a bet for the selected first game, code for executing, at the server, the first selected game with the bet, code for determining, at the server, an outcome of the executed first selected game, code for determining, at the server, a first score for the first electronic user device based on a comparison of the bet and the outcome, code for ranking, at the server, the plurality of electronic user devices in a leaderboard based on a comparison of the first score with a plurality of corresponding scores for the remaining plurality of electronic user devices, including code for providing each of the plurality of electronic user devices with a ranking level within the leaderboard, code for removing, at the server, the first electronic user device from the leaderboard if the level of ranking for the first electronic user device is below a predetermined threshold, wherein the predetermined threshold is increased over time, code for forming, at the server, a graphical representation of the leaderboard, code for distributing, from the server to the plurality of electronic user devices, the graphical representation of the leaderboard, and code for controlling, using the server, the plurality of electronic user devices to display the graphical representation of the leaderboard within the GUI of each of the plurality of electronic user devices. Also this aspect of the present disclosure provides similar advantages and includes similar embodiments as discussed above in relation to the previous aspects of the present disclosure.

The computer program product is typically executed using a computing device comprised with the server, preferably including a microprocessor or any other type of computing device. Similarly, a software executed by the server for operating the gaming system may be stored on a computer readable medium, being any type of memory device, including one of a removable non-volatile random access memory, a hard disk drive, a floppy disk, a CD-ROM, a DVD-ROM, a USB memory, an SD memory card, or a similar computer readable medium known in the art. Accordingly, operation of the gaming system may be at least partly automated, implemented as e.g. software, hardware and a combination thereof.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which:

FIGS. 3A and 3B show exemplary leaderboards to be presented for a player in conjunction with the present concept.

DETAILED DESCRIPTION

Figure 1:
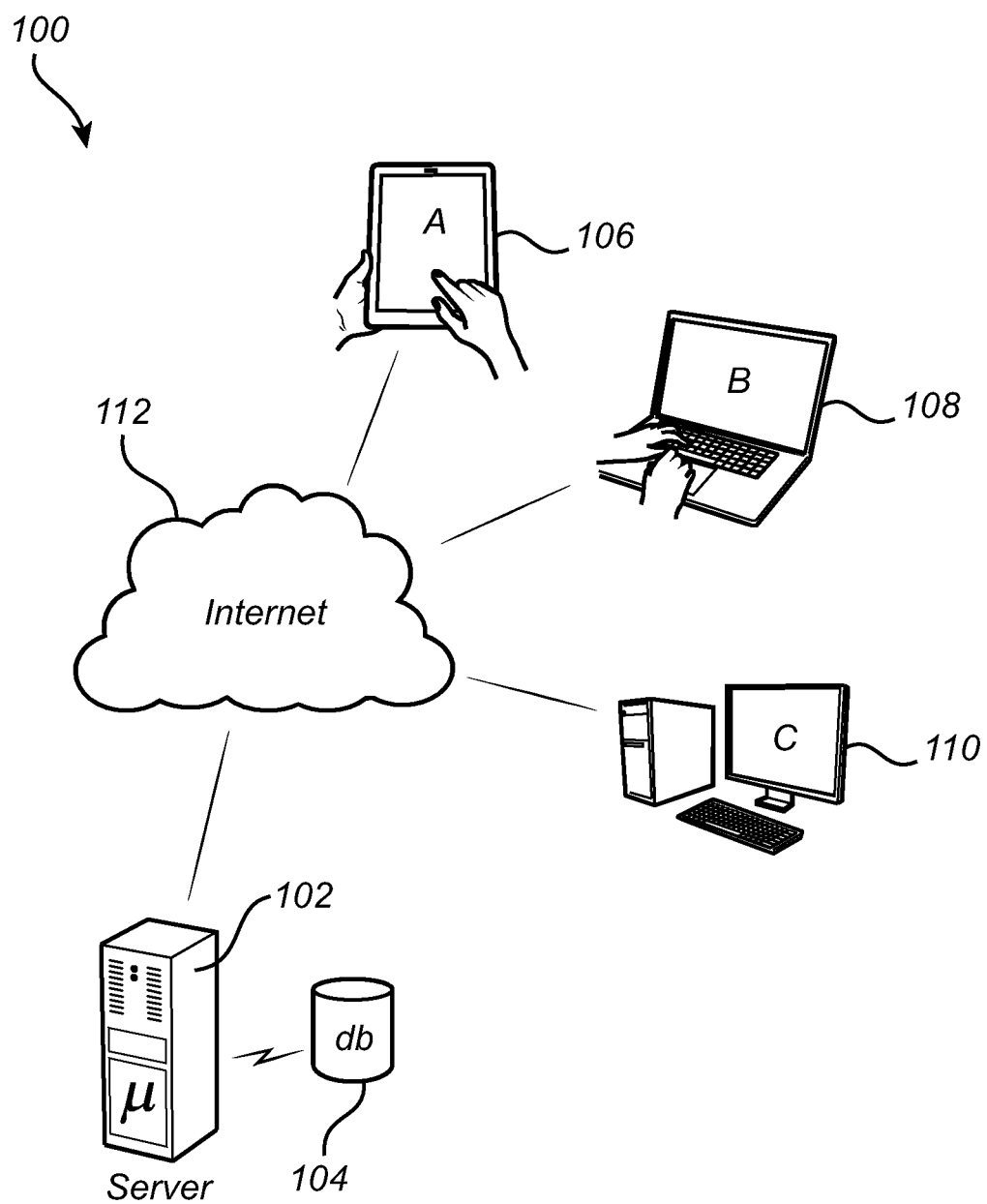
FIG. 1 illustrates an exemplary electronic gaming system according to a currently preferred embodiment of the present disclosure.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled addressee. Like reference characters refer to like elements throughout.

Referring now to the drawings and FIG. 1 in particular, there is depicted a gaming system 100 in which an online game, such as a slot game, may be played according to a currently preferred embodiment of the present disclosure. The system architecture illustrated in FIG. 1 depicts a system environment in which systems, methods, apparatus, computer-readable mediums and data structures consistent with the principles of some embodiments of the present disclosure may be included. It may be appreciated that the components of system 100 may be implemented through any suitable combinations of hardware, software, and/or firmware.

As shown in FIG. 1, system 100 includes at least one server 102 and/or at least one gaming database 104. Server 102 and gaming database 104 may be communicably linked to one or more client devices 106, 108, 110, etc. through a network 112. The network 112 may be wired or wireless, including for example wired connections like a building LAN, a WAN, an Ethernet network, an IP network, etc., and wireless connections like WLAN, CDMA, GSM, GPRS, 3G mobile communications, 4G mobile communications, Bluetooth, infrared, or similar. As such, the network 112 may be locally and/or globally provided.

The gaming database 104 may be any type of physical unit on which games reside, such as a machine in a gaming venue, a lottery machine, an electronic game system, etc. Network 112 may be implemented as the Internet, or any local or wide area network, either public or private. Network 112 may also be a hardware system physically connecting some or all of the server 102 and client devices 106, 108, 110. Client devices 106, 108, 110 may be implemented as any computing devices such as a personal computing device, a server, a server network, handheld computing device, slot machine, other gaming machine in a gaming venue such as a betting terminal, a gaming console, lottery machine, an interface in a virtual environment, etc.

It may be appreciated by one of ordinary skill in the art that while only one server, one gaming database, one network and two client devices are depicted, more or fewer servers, more or fewer gaming databases, more networks and more or fewer client devices and/or other devices may reside within system 100.

The elements inside system 100 may include one or more (micro) processors, purpose-built hardware such as, for example, FPGA, ASIC, etc., software systems and applications, software packages, mechanical and electrical parts, etc. Software packages that may be part of server 102, gaming database 104, client devices 106, 108, 110 and network 112 may be recorded on a computer readable medium such as a memory device, RAM, CD/DVD/USB drives, handheld memory device, etc., and/or may be part of a physical device such as one or more (microprocessors or electro-mechanical systems. Any of server 102, gaming database 104, client devices 106, 108, 110 and network 112 may be fixed systems, mobile systems, portable systems, or cloud systems (as discussed above).

FIG. 1 shows only three electronic user devices 106, 108, 110, however it should be understood that a general implementation of the present disclosure comprises a large plurality of electronic user devices, possibly greatly above three, such as 100, 1000, 10000, etc.

Although the various components of FIG. 1 are illustrated as discrete elements, it should be recognized that certain operations of some of the various components may be performed by the same physical device, e.g., by one or more microprocessors or other type of devices.

Figure 2:
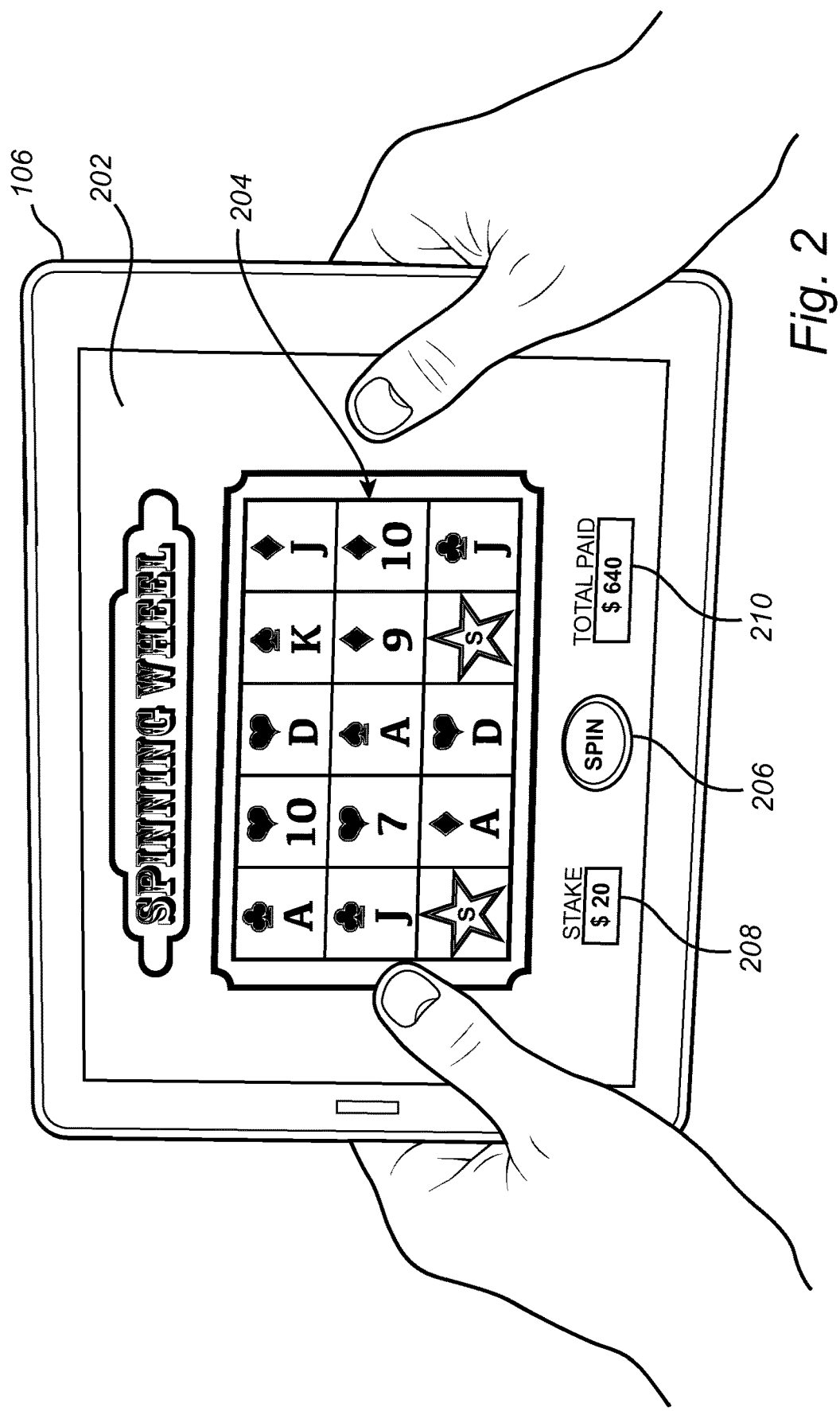
FIG. 2 provides an exemplary illustration of a typical graphical user interface (GUI) for use in playing a game.

Turning now to FIG. 2 illustrating a graphical user interface (GUI) 202 to be displayed at one of the above discussed client devices 106, 108, 110, in the illustrated embodiment provided as an application ("app") or within e.g. a web browser of the portable client device 106 being a tablet. The online game of chance to be played within the GUI is in the exemplary illustration a slot game, visualized within the GUI 202 as comprising five individual reels 204 provided with a plurality of different symbols (and various lines). The GUI also comprises a "button" 206 to start the game, here provided with the description "SPIN" for initiating a turn of the game. In addition, the GUI 202 comprises an indicator of the current stake 208 (i.e. payment for each turn of the game) and an indicator of the total payment to the player 210. It should in any case be understood that other types of games may be played within the scope of the present disclosure, for example being skill based as compared to a game of chance.

Figure 4:
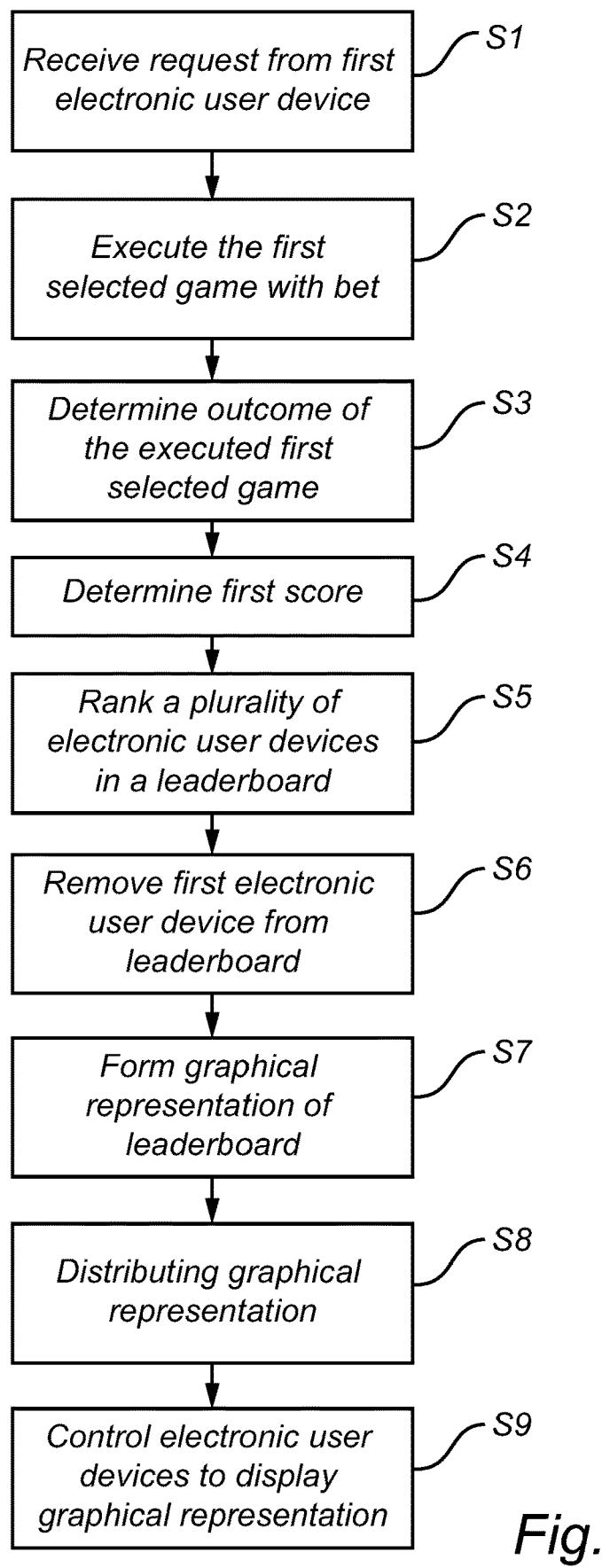
FIG. 4 is a flow chart illustrating the exemplary steps for operating an electronic gaming system.

During operation gaming system 100, with further reference to FIGS. 3A and 4, the server 102 receives, S1 a request from a first electronic user device 106 of the plurality of electronic user devices 106, 108, 110 to enter into one of a plurality of games provided by the server 102, such as e.g. the slot game as shown in FIG. 2, or another game of chance, or a game of skill. Further to dictating the desired game to play, the request that is provided from the first electronic user device 106 to the server 102 further comprises a bet for the selected game.

The bet is generally monetary but may be in any form suitable for use in relation to the specific game. It may further be possible to provide the player with e.g. a bonus, promotional free spins, etc.

The server 102 will subsequently execute, S2, the selected game based on the bet. The bet may in some embodiments have a maximum and/or a minimum level, possibly dependent on the type of game to be played. The server 102 will then determine, S3, an outcome of the executed first selected game.

That is, in case for example the player bets $20, the outcome is typically a multiplication factor of the bet, where the multiplication factor possibly may be from 0 to a maximum set for the game. This effectively may result in that the player may get anything from 0×$20 back to maximum multiplication factor×$20 back. That is, the player may lose his bet completely, get a portion of the bet back, get the total bet back, or get more than the bet back.

The server 102 will then determine, S4, a first score for the first electronic user device 106 based on a comparison of the bet and the outcome. Typically, the score is determined as a quote of the outcome divided by the bet.

Accordingly, the score may for example be from 0 to the maximum multiplication factor. Other calculations are possible and within the scope of the present disclosure, such as for example including a weight being dependent on factors such as time spent playing the game, the type of the game, the total wagering during the promotional period or number of bets (spins), etc.

The score will subsequently be used by the server 102 for determining how well the specific player performed in relation to other players playing the same or other players, by ranking, S5, the players.

The ranking will additionally include providing each of the plurality of electronic user devices with a ranking level within the leaderboard, such as a number within the leaderboard. In an embodiment of the present disclosure the request comprises an opt-in to join the leaderboard.

As such, only players having opted in may be ranked. Accordingly, the server 102 may implement a functionality to ensure that only opted in players are included in the leaderboard.

Still further, it may be possible to only allow specific geographical areas to be included with the leaderboard, for example dependent on specific jurisdictions for the geographical area where the player is located.

Furthermore, the server 102 is additionally arranged to remove, S6, the first electronic user device from the leaderboard if the level of ranking for the first electronic user device is below a predetermined threshold, wherein the predetermined threshold is increased over time, in accordance to the discussion as has been provided above.

Based on the ranking including the removal of first electronic user device, the server 102 may form, S7, a graphical representation of the leaderboard that is to be distributed, S8, from the server 102 to the plurality of electronic user devices 106, 108, 110, whereby the server controls, S9, the plurality of electronic user devices to display the graphical representation of the leaderboard is subsequently to be displayed within the GUI of each of the plurality of electronic user devices 106, 108, 110. The graphical representation must not necessary include the exact information to be presented within the GUI of each of the plurality of electronic user devices 106, 108, 110. Rather, representative data may be provided from the server 102 to the plurality of electronic user devices 106, 108, 110, allowing rendering to be performed at the plurality of electronic user devices 106, 108, 110 for display within the respective GUIs.

In a further embodiment of the present disclosure, as is shown in FIG. 3B, the different users are not necessarily presented (only) as individual entities. Rather, within the scope of the present disclosure it may be possible to enable for groups to be formed, for example based on a geographical location of the plurality of electronic user devices 106, 108, 110.

As shown in FIG. 3B, five separate groups are formed, totally including 100 electronic user devices divided in 20 electronic user devices per group, thus presenting five different groups. In this embodiment the server 102 is adapted to accumulate the scores from all of the "members" of each groups, such that the total score for the members within each group is used for ranking each of the groups in relation to each other. As exemplified in FIG. 3B, a Swedish group is shown to be slightly ahead of a Maltese group, in turn slightly ahead of a UK group. A Belgian group is shown to be in a fourth place, whereas a Romanian group is shown in the last place.

In relation to each of the scenarios presented in FIGS. 3A and 3B, it may be possible to allow the leaderboard to be somewhat time based, meaning that the leaderboard is "valid" for a predetermined (or possibly dynamic) time period. In effect, the server 102 may in one embodiment set a time counter when one player is entering the leaderboard and compare the time counter with a predetermined time period. Once the time period has come to an end, the server 102 may automatically present a number of "winners", where the player ranking number one is selected to be the overall winner. The overall winner, or a plurality of winners may be given a reward based on the overall performance during the predetermined time period. Such a reward may for example be based on the type of the game or games played.

The invention comprises the steps of comparing, at the server, the level of ranking for the first electronic user device with a threshold, and removing, at the server, the first electronic user device from the leaderboard if the level of ranking for the first electronic user is below the threshold. The threshold is dynamically altered over time by dividing the intervals in which a leaderboard is run into intervals which can be equal in length or vary in length or by utilizing a pseudo algorithm that provides for the intervals to be shorter or longer either at the beginning or end phases of the leaderboard, or alternatively the intervals may vary in length for the entire time that the leaderboard is run. At the end of an interval a least successful player or players will be removed from the leaderboard. In order for a player to enter the leaderboard, the score of the second least successful player needs to be matched or beaten therefore increasing the threshold for entering the leaderboard as time passes.

In summary, the present disclosure relates to a computer implemented method performed by a gaming system, the gaming system comprising a server arranged in communication with a plurality of electronic user devices using a network connection, the plurality of electronic user devices each provided with a display unit adapted to present a graphical user interface (GUI), wherein the method comprises the steps of receiving, at the server, a request from a first electronic user device of the plurality of electronic user devices to enter into one of a plurality of games provided by the server, the request comprising a selection of a first one of the plurality of games and a bet for the selected first game, executing, at the server, the first selected game with the bet, determining, at the server, an outcome of the executed first selected game, determining, at the server, a first score for the first electronic user device based on a comparison of the bet and the outcome, ranking, at the server, the plurality of electronic user devices in a leaderboard based on a comparison of the first score with a plurality of corresponding scores for the remaining plurality of electronic user devices, including providing each of the plurality of electronic user devices with a ranking level within the leaderboard, removing, at the server, the first electronic user device from the leaderboard if the level of ranking for the first electronic user device is below a predetermined threshold, wherein the predetermined threshold is increased over time, forming, at the server, a graphical representation of the leaderboard, distributing, from the server to the plurality of electronic user devices, the graphical representation of the leaderboard, controlling, using the server, the plurality of electronic user devices to display the graphical representation of the leaderboard within the GUI of each of the plurality of electronic user devices.

Advantages with the present disclosure includes an improved attraction to the gaming concept by providing a novel way for players operating individual electronic user devices and possibly playing different games to share a common leaderboard, where the individual players may be ranked based on a threshold which dynamically changes over time and compared to each other. In line with the present disclosure, the bet placed by an individual player (operating his electronic user device) and the outcome of the bet will be used to form a specific score for that player playing a specific game.

In addition, the control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon.

Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium.

Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art. Further, a single unit may perform the functions of several means recited in the claims. In the claims, any reference signs placed between parentheses shall not be construed as limiting to the claim. Furthermore, in the claims, the word "comprising" does not exclude other elements or steps, and the indefinite article "a" or "an" does not exclude a plurality.

Variations to the disclosed embodiments can be understood and effected by the skilled addressee in practicing the claimed present disclosure, from a study of the drawings, the disclosure, and the appended claims. The person skilled in the art realizes that the present disclosure is not limited to the preferred embodiments.

The invention claimed is:

1. A computer implemented method performed by a gaming system, the gaming system comprising a server arranged in communication with a plurality of electronic user devices using a network connection, the plurality of electronic user devices each provided with a display unit adapted to present a graphical user interface (GUI), wherein the method comprises the steps of:

receiving, at the server, a request from a first electronic user device of the plurality of electronic user devices to enter into one of a plurality of games provided by the server, the request comprising a selection of a first one of the plurality of games and a bet for the selected first game;

executing, at the server, the first selected game with the bet;

determining, at the server, an outcome of the executed first selected game;

determining, at the server, a first score for the first electronic user device based on a comparison of the bet and the outcome;

ranking, at the server, the plurality of electronic user devices in a leaderboard based on a comparison of the first score with a plurality of corresponding scores for the remaining plurality of electronic user devices, including providing each of the plurality of electronic user devices with a ranking level within the leaderboard;

removing, at the server, the first electronic user device from the leaderboard if the level of ranking for the first electronic user device is below a predetermined threshold, wherein the predetermined threshold is increased over time, forming, at the server, a graphical representation of the leaderboard, distributing, from the server to the plurality of electronic user devices, the graphical representation of the leaderboard, and controlling, using the server, the plurality of electronic user devices to display the graphical representation of the leaderboard within the GUI of each of the plurality of electronic user devices.

2. The method according to claim 1, wherein the first score for the first electronic user device is formed by accumulating scores from a plurality of subsequently executed games requested by the first electronic user device.

3. The method according to claim 2, wherein only scores larger than zero are included when accumulating the scores.

4. The method according to claim 1, wherein ranking the plurality of electronic user devices is further based on a predetermined weight given to the game selected by each of the plurality of electronic user devices.

5. The method according to claim 1, further comprising the steps of:

determining a specified time in which the leaderboard will run;

dividing, at the server, the specified time frame into intervals; and removing, at the server, a least successful electronic user device(s) from the leaderboard at an end of each interval.

6. The method according to claim 5, in which the specified time frame is divided into intervals by:

dividing the specified time frame by a number of players that originally join the leaderboard; and/or utilizing a pseudo algorithm.

7. The method according to claim 6 in which the intervals are shorter at a beginning phase or end phase of the specified time frame of the leaderboard.

8. The method according to claim 1, wherein the determination of the first score for the first electronic user device is further based on a multiplication factor.

9. The method according to claim 8, wherein the multiplication factor is further based on a parameter of game selected by the first electronic user device.

10. The method according to claim 8, wherein the multiplication factor is time based.

11. A gaming system comprising a server arranged in communication with a plurality of electronic user devices using a network connection, the plurality of electronic user devices each provided with a display unit adapted to present a graphical user interface (GUI), wherein the server is adapted to:

receive a request from a first electronic user device of the plurality of electronic user devices to enter into one of a plurality of games provided by the server, the request comprising a selection of a first one of the plurality of games and a bet for the selected first game;

execute the first selected game with the bet;

determine an outcome of the executed first selected game;

determine a first score for the first electronic user device based on a comparison of the bet and the outcome;

rank the plurality of electronic user devices in a leaderboard based on a comparison of the first score with a plurality of corresponding scores for the remaining plurality of electronic user devices, including providing each of the plurality of electronic user devices with a ranking level within the leaderboard;

remove the first electronic user device from the leaderboard if the level of ranking for the first electronic user device is below a predetermined threshold, wherein the predetermined threshold is increased over time, form a graphical representation of the leaderboard, distribute, to the plurality of electronic user devices, the graphical representation of the leaderboard, and control the plurality of electronic user devices to display the graphical representation of the leaderboard within the GUI of each of the plurality of electronic user devices.

12. The gaming system according to claim 11, wherein the server is further adapted to:

determine a specified time in which the leaderboard will run;

divide the specified time frame into intervals; and remove a least successful electronic user device(s) from the leaderboard at an end of each interval.

13. The gaming system according to claim 12, in which the specified time frame is divided into intervals by:

dividing the specified time frame by a number of players that originally join the leaderboard; and/or utilizing a pseudo algorithm.

14. The gaming system according to claim 13 in which the intervals may be shorter at a beginning phase or end phase of the specified time frame of the leaderboard.

15. The gaming system according to claim 11, wherein the determining the first score for the first electronic user device is further based on a multiplication factor.

16. The gaming system according to claim 15, wherein the multiplication factor is further based on a parameter of game selected by the first electronic user device.

17. The gaming system according to claim 15, wherein the multiplication factor is time based.

18. The gaming system according to claim 11, wherein the request further comprises a geographical location of the first electronic user device and only electronic user devices located within the same geographical location is arranged in the same leaderboard.

19. A computer program product comprising a non-transitory computer readable medium having stored thereon computer program means for operating a gaming system, the gaming system comprising a server arranged in communication with a plurality of electronic user devices using a network connection, the plurality of electronic user devices each provided with a display unit adapted to present a graphical user interface (GUI), wherein the computer program product comprises:

code for receiving, at the server, a request from a first electronic user device of the plurality of electronic user devices to enter into one of a plurality of games provided by the server, the request comprising a selection of a first one of the plurality of games and a bet for the selected first game;

code for executing, at the server, the first selected game with the bet;

code for determining, at the server, an outcome of the executed first selected game;

code for determining, at the server, a first score for the first electronic user device based on a comparison of the bet and the outcome;

code for ranking, at the server, the plurality of electronic user devices in a leaderboard based on a comparison of the first score with a plurality of corresponding scores for the remaining plurality of electronic user devices, including code for providing each of the plurality of electronic user devices with a ranking level within the leaderboard;

code for removing, at the server, the first electronic user device from the leaderboard if the level of ranking for the first electronic user device is below a predetermined threshold, wherein the predetermined threshold is increased over time, code for forming, at the server, a graphical representation of the leaderboard, code for distributing, from the server to the plurality of electronic user devices, the graphical representation of the leaderboard, and code for controlling, using the server, the plurality of electronic user devices to display the graphical representation of the leaderboard within the GUI of each of the plurality of electronic user devices.

* * * * *